United States Patent [19]

Mudge et al.

[11] Patent Number: 5,434,216
[45] Date of Patent: Jul. 18, 1995

[54] WOODWORKING LATEX ADHESIVES WITH IMPROVED WATER, HEAT AND CREEP RESISTANCE

[75] Inventors: Paul R. Mudge, Belle Mead; Pravin K. Kukkala, Raritan, both of N.J.; John Walker, Lane Cove, Australia

[73] Assignee: National Starch and Chemical Investment Holding Corporation, Wilmington, Del.

[21] Appl. No.: 60,177

[22] Filed: May 7, 1993

[51] Int. Cl.⁶ .............. C08L 29/04; C08F 18/08; C09J 129/04
[52] U.S. Cl. .............. 524/803; 524/459; 524/503; 525/58; 525/61; 156/332; 156/335
[58] Field of Search .......... 524/459, 503, 510, 555, 524/803, 231, 247, 306, 317; 525/58, 142, 143, 157; 156/327

[56] References Cited

U.S. PATENT DOCUMENTS

| | | | |
|---|---|---|---|
| 3,041,301 | 6/1962 | Armour | 524/510 |
| 3,301,809 | 1/1967 | Goldberg et al. | 524/459 |
| 3,433,701 | 3/1969 | Armour | 428/436 |
| 3,563,851 | 2/1971 | Armour et al. | 428/514 |
| 3,714,105 | 1/1973 | Stehle et al. | 260/29.6 WA |
| 3,827,996 | 8/1974 | Beresniewicz | 524/459 |
| 3,925,289 | 12/1975 | Sakato et al. | 524/555 |
| 4,474,915 | 10/1984 | Grinacoff | 524/111 |
| 4,521,561 | 6/1985 | Hausman et al. | 524/459 |
| 4,687,809 | 8/1987 | Kamikaseda et al. | 525/57 |
| 5,143,966 | 9/1992 | Lee et al. | 524/459 |
| 5,182,328 | 1/1993 | Iacoveillo et al. | 524/803 |
| 5,278,211 | 1/1994 | Chandran | 524/459 |

*Primary Examiner*—Tae H. Yoon
*Attorney, Agent, or Firm*—Ellen T. Dec

[57] ABSTRACT

Water resistant emulsions for woodworking adhesives may be prepared using an emulsion polymer, the polymer being prepared in the presence of 1 to 2.5% by weight of 88% hydrolyzed polyvinyl alcohol and 1 to 4% by weight of 95–99.5% (or above) hydrolyzed polyvinyl alcohol.

7 Claims, No Drawings

WOODWORKING LATEX ADHESIVES WITH IMPROVED WATER, HEAT AND CREEP RESISTANCE

BACKGROUND OF THE INVENTION

Aqueous emulsions of N-methylol acrylamide—vinyl acetate polymers are widely used in formulating wood adhesives wherein bond strength, fast setting, colorless glue lines and ease of application are desired. Protective colloids are often added to stabilize the emulsions against gelling during storage and to improve water resistance. For these purposes, 88% hydrolyzed polyvinyl alcohol is the most commonly used protective colloid. It is generally agreed that as the degree of hydrolysis of the polyvinyl alcohol increases above 88% its ability to perform as an effective protective colloid decreases leading to lower mechanical stability of the final latex. This problem is accentuated by the presence of water soluble resins such as resorcinol-formaldehyde, urea-formaldehyde, melamine-formaldehyde, or phenol-formaldehyde resins and trimethylol phenol oligomer or with fusion aids, such as tetrahydrofurfuryl alcohol or ethylene glycol diacetate which are generally added to improve water resistance and other properties of these adhesives. These pre-formulated adhesives may then be catalyzed with various acidic metal salts as is known in the art. These adhesive systems are described, for example, in U.S. Pat. Nos. 3,301,809; 3,563,851; 3,433,701; 3,041,301; 4,474,915 and 4,687,809.

While such formulated vinyl acetate based adhesives provide adequate water resistance for plywood and finger jointed lumber constructions tested at room temperature, under vacuum-pressure soaks and in boiling water these vinyl acetate adhesives do not meet ASTM standards for exterior lumber, especially ASTM D-3110 for edge glued lumber in general. This is illustrated by the requirements for these tests on lumber, as well as the values obtained using conventional formulated crosslinked polyvinyl acetate adhesives (PVA) on pine presented in the table below.

|  | Room Temp. | Pressure Soaks | Boils |
|---|---|---|---|
| Finger-Jointed | | | |
| Typical PVA (Pine) | 4498 psi, 96% WF | 2400 psi, 68% WF | 2200 psi, 60% WF |
| Requirements | 2000 psi, 60% WF | 1600 psi, 50% WF | 1600 psi, 50% WF |
| Edge Glued | | | |
| Typical PVA (Pine) | 1411 psi, 97% WF | 275 psi, 20% WF | 300 psi, 15% WF |
| Requirements | 678 psi, 60% WF | 565 psi, 50% WF | 565 psi, 50% WF |

WF = % wood failure or % wood tear

SUMMARY OF THE INVENTION

We have now found that superior water resistant emulsions for use in woodworking adhesives may be prepared from vinyl acetate based N-methylol acrylamide polymer emulsions which are stabilized with 1.5 to 2.5% by weight of 88% hydrolyzed polyvinyl alcohol and 1 to 4% by weight of 95–99.5% hydrolyzed polyvinyl alcohol, the two alcohols comprising at least 3% by weight of the emulsion solids. Most of the resultant formulated adhesives pass not only the finger jointed lumber requirements but also the ASTM D-3110 requirements for edge glued lumber.

DETAILED DESCRIPTION OF THE PREFERRED EMBODIMENTS

The polyvinyl acetate based adhesives of the present invention are prepared from N-methylol acrylamide/vinyl acetate polymers of vinyl acetate containing up to 40% of any polymerizable monomer, such for example as copolymers containing N-methylol acrylamide and vinyl acetate in combination with: (1) other vinyl esters including vinyl formate, vinyl propionate, vinyl butyrate, vinyl isobutyrate, vinyl valerate, vinyl 2-ethylheanoate, vinyl isooctanoate, vinyl nonoate, vinyl decanoate, vinyl pivalate, vinyl versatate, and the like; (2) ethylene; (3) alkyl esters of acrylic and methacrylic acid such as methyl acrylate, methyl methacrylate, ethyl acrylate, ethyl methacrylate, etc.; (4) substituted or unsubstituted mono and dialkyl esters of alpha, beta-unsaturated dicarboxylic acids such as the substituted and unsubstituted mono and dibutyl, mono and diethyl maleate esters as well as the corresponding fumarates, itaconates and citronates; (5) alpha, beta-unsaturated carboxylic acids such as crotonic, acrylic, metacrylic, fumaric, maleic, itaconic and citraconic acids.

In addition to the vinyl acetate and optional monomers described previously, pre-crosslinking and/or post-crosslinking monomers may optionally be present in the polymer.

N-methylol acrylamide is present as a postcrosslinking agent in an amount of 0.1 to 6% by weight of polymer solids. While N-methylol acrylamide is the most commonly available monomer, other crosslinking agents such as N-ethanol acrylamide, N-propanol acrylamide, N-methylol methacrylamide, N-ethanol acrylamide, N-propanol acrylamide, N-methylol maleamide, N-methylol maleamic acid, N-methylol maleamic acid esters; the N-alkylol amides of the vinyl aromatic acids, such as N-methylol-p-vinylbenzamide and the like; also N-(alkoxymethyl) acrylates and methacrylates, where the alkyl group has from 1–8 carbon atoms, such as N-(methoxymethyl) acrylamide, N-(butoxymethyl) acrylamide, N-(methoxymethyl) methacrylamide, N-(butoxymethyl) allyl carbamate and N-(methoxymethyl) allyl carbamate, and mixtures of these monomers with allyl carbamate, acrylamide or methacrylamide may also be used.

Olefinically unsaturated acids may also be employed the polymerization to improve adhesion and to contribute additional heat resistance. These acids include the alkenoic acids having from 3 to 6 carbon atoms, such as acrylic acid, methacrylic acid, crotonic acid; alkenedioic acids, e.g., itaconic acid, maleic acid or fumaric acid or mixtures thereof in amounts sufficient to provide up to about 4 percent, preferably 0.5 to 2.5 percent, by weight of the polymer solid.

In addition, certain copolymerizable monomers which assist in the stability of the copolymer emulsion, e.g., vinyl sulfonic acid and 2-acrylamido-2-methylpropane sulfonic acid are used herein as latex stabilizers. These stabilizers are added in amounts of from about 0.2 to 3% by weight of the solid of the monomer mixture.

Conventional batch, semi-batch or continuous emulsion polymerization procedures may be utilized herein.

Suitable as polymerization catalysts are the water-soluble free-radical-formers generally used in emulsion polymerization, such as hydrogen peroxide, sodium persulfate, potassium persulfate and ammonium persulfate, as well as tert-butyl hydroperoxide, in amounts of between 0.01 and 3% by weight, preferably 0.01 and 1% by weight based on the total amount of the emulsion solids. They can be used alone or together with reducing agents such as sodium formaldehydesulfoxylate, ferrous salts, sodium dithionite, sodium hydrogen sulfite, sodium sulfite, sodium thiosulfate, as redox catalysts in amounts of 0.01 to 3% by weight, preferably 0.01 to 1% by weight, based on the total amount of the emulsion solid.

The free-radical-formers can be charged with the protective colloid or be added during the polymerization in doses.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, like mercaptans, aldehydes, chloroform, ethylene chloride and trichloroethylene, can also be added in some cases.

The polymerization is carried out using conventional methods but employing, as the protective colloid, 1.5 to 2.5% by weight, preferably 2 to 2.5%, of 88% hydrolyzed polyvinyl alcohol and 1 to 4% by weight, preferably 2 to 3% of the 95–99.5% hydrolyzed polyvinyl alcohol, the total of the two types of alcohols comprising at least 3% by weight of the emulsion solids. This specific range of the two different grades of polyvinyl alcohol, as opposed to the average degree of hydrolysis of the two alcohols, has been found necessary in order to insure adequate water resistance without sacrificing the stability of the emulsion. The molecular weight of the polyvinyl alcohol has not been found to be critical to the invention and low, medium, or high viscosity grades may therefore be added depending upon the viscosity desired the end product.

The polyvinyl alcohol may be added, in its entirety, to the initial charge in the polymerization zone or a portion of the emulsifier, e.g., from 25 to 90 percent thereof, can be added continuously or intermittently during polymerization.

The polymerization reaction is generally continued until the residual vinyl acetate monomer content is below about 1%. The completed reaction product is then allowed to cool to about room temperature, while sealed from the atmosphere.

The emulsions may be used in any conventional woodworking adhesive compositions and formulated with such additives as are commonly used in the production of these adhesives. Such additives include formaldehyde resins such as resorcinol formaldehyde, urea formaldehyde, melamine formaldehyde and phenol formaldehyde; as well as A- or B-stage phenolic resins, such as trimethylol phenol oligomer, prepared by means of any conventional phenolaldehyde condensation reaction which may be added in an amount of 1 to 20%, by weight, based on total emulsion, preferably 3 to 10%, by weight. The adhesives may also be formulated with 1 to 7%, by weight, polymer solids of a fusion aid such as tetrahydrofurfuryl alcohol, ethylene glycol diacetate, and ethylene glycol monoethyl ether acetate as taught in U.S. Pat. No. 4,474,915, the disclosure of which is incorporated herein by reference.

The addition of acidic, metal salt curing agents may also be desired in order to accelerate the cure of the formulated adhesive. The preferred curing agents for use herein comprise acidic, metal salts selected from the group consisting of chromic nitrate, chromic perchlorate, aluminum nitrate, aluminum chloride, zinc nitrate, and para-toluene sulfonic acid. The proportion of acidic, metal salt curing agent which is added will depend upon the rate of cure which is desired in the final product but a practical range has been found to be from about 0.003 to 0.12 gram equivalents of curing agent (anhydrous basis) for each 100 grams of the total weight of the blend of the adhesive composition.

If fusion aids are used in the formulation, it may also be desirable to add cross-linking inhibitors such as are described in U.S. Pat. No. 4,085,074 issued Apr. 18, 1978 to M. C. Woo and re-issued as U.S. Pat. Re. No. 30,576. Typical inhibitors include ammonia, alkyl amines (e.g., triethyl amine), and alkylol amines (e.g., triethanol amine and N-methylethanol amine). When used, they are added ordinarily in amounts such that the mole ratio of the inhibitor to curing agent ranges from 0.1 to 1.7. They may be added to the vessel at the end of the polymerization reaction or they may be post added prior to, or with, the curing agent. Their addition improves the storage stability of the adhesives.

In preparing the adhesive compositions of this invention, it is merely necessary first to combine, by mixing, the aqueous emulsion polymer with the additive(s).

The following examples illustrate the use of a vinyl acetate homopolymer based emulsion polymer prepared in a protective colloid such as polyvinyl alcohol (PVOH) and containing 3% by weight of N-methylol acrylamide (NMA), as a wood working adhesive.

The examples are given to illustrate the present invention, but it will be understood that they are intended to be illustrative only and not limitative of the invention. In the examples, all parts are by weight and all temperatures in degrees Celsius unless otherwise noted.

In evaluating the various polyvinyl alcohols as a means of improving the performance of a woodworking adhesive, the emulsion was compared with a commonly used wood working adhesive, whose performance properties and technical values are well known. This standard or control (Example 1) comprises a protective colloid (88% hydrolyzed medium viscosity polyvinyl alcohol) stabilized latex of vinyl acetate homopolymer incorporating the cross-linking monomer NMA. The emulsion polymers containing higher hydrolyzed polyvinyl alcohols such as 95% or 98% hydrolyzed polyvinyl alcohol were made by replacing part of the 88% polyvinyl alcohol on a weight equivalent basis.

EXAMPLE 1 (CONTROL)

The standard polyvinyl alcohol stabilized vinyl acetate emulsion homopolymer containing N-methylol acrylamide was prepared as a control according to the following:

A 2-liter glass reactor equipped with heating/cooling jackets, variable stirrer and means of metering monomer and initiator was employed. To the 2-L reactor was charged 175.0 g (of a 10% w/w solution in water) of medium viscosity, 88% hydrolyzed polyvinyl alcohol, 0.10 g sodium acetate, 0.50 g (of a 1% w/w solution in water) ferrous sulfate solution, 0.5 g sodium formaldehyde sulfoxylate, 1.25 g of Lanolubric (a coconut fatty acid defoamer), and 150 g of water. The pH was adjusted to 5.2 with phosphoric acid. After purging with nitrogen, 75 g of vinyl acetate was charged to the reactor.

The polymerization was then initiated at 60° C. by metering in a solution of 1.00 g of ammonium persulfate in 35 g of water and 0.59 g of sodium formaldehyde sulfoxylate in 35 g of water at a rate of 6 mL/hour. The reaction temperature was allowed to raise to 74° C. At this temperature, the catalyst solution addition rate was increased to 8 mL/hour.

Concurrently added with the initiator at 74° C. over a period of 3 hours were 425 g of vinyl acetate and 31.25 g of N-methylol acrylamide (48% w/w solution in water), both monomers preemulsified with 1.67 g (of a 80% w/w solution in water) sodium salt of a dialkyl sulfosuccinate, 7.5 g (of a 70% w/w solution in water) alkyl aryl polyethylene oxide (30 moles ethylene oxide), 25 g (of a 10% w/w solution in water) of medium viscosity, 88% hydrolyzed polyvinyl alcohol, 3.5 g of 10% ammonium hydroxide solution and 100 g of water. On completion of addition of the preemulsified monomer mixture, the catalyst addition was continued for another half hour to ensure completion of reaction. The characteristics of the latex obtained are shown in Table 1.

EXAMPLE 2

Using the general procedure described in Example 1, an adhesive was prepared by replacing 100 g of the 10% aqueous solution of 88% hydrolyzed, medium viscosity PVOH with a 10% aqueous solution of 98% hydrolyzed, medium viscosity PVOH. The characteristics of the latex are shown in Table 1.

EXAMPLE 3

Using the general procedure described in Example 1, an adhesive was prepared by replacing 100 g of the 10% aqueous solution of 88% hydrolyzed, medium viscosity PVOH with 200 g of a 7.5% aqueous solution of 98% hydrolyzed, medium viscosity PVOH. The initial charge of water was decreased from 150 g to 56 g. The characteristics of the latex are shown in Table 1.

EXAMPLE 4 (Comparative)

Using the general procedure described in Example 1, an adhesive was prepared by replacing 150 g of the 10% solution of 88% hydrolyzed, medium viscosity PVOH with 200 g of a 7.5% aqueous solution of 98% hydrolyzed, medium viscosity PVOH. The initial charge of water was decreased from 150 g to 90 g. The characteristics of the latex are shown in Table 1.

EXAMPLE 5 (Comparative)

Using the general procedure described in Example 1, an adhesive was prepared by replacing 50 g of the 10% aqueous solution of 88% hydrolyzed, medium viscosity PVOH with 133 g of a 7.5% aqueous solution of 98% hydrolyzed, medium viscosity PVOH. The initial charge of water was decreased from 150 g to 75 g. The characteristics of the latex are shown in Table 1.

EXAMPLE 6 (Comparative)

Using the general procedure described in Example 1, an adhesive was prepared by replacing 50 g of the 10% aqueous solution of 88% hydrolyzed, medium viscosity PVOH from the initial charge with 200 g of a 7.5% aqueous solution of 98% hydrolyzed, medium viscosity PVOH. The amount of water added was decreased from a total of 250 g to 110 g. The characteristics of the latex are shown in Table 1.

EXAMPLE 7

Using the general procedure described in Example 1, an adhesive was prepared by replacing 100 g of the 10% aqueous solution of 88% hydrolyzed, medium viscosity PVOH with 133 g of a 7.5% aqueous solution of 98% hydrolyzed, medium viscosity PVOH and 67 g of a 7.5% aqueous solution of 98% hydrolyzed, low viscosity PVOH. The initial charge of water was decreased from 150 g to 56 g. The characteristics of the latex are shown in Table 1.

EXAMPLE 8

Using the general procedure described in Example 1, an adhesive was prepared by replacing 100 g of the 10% aqueous solution of 88% hydrolyzed, medium viscosity PVOH with 200 g of a 7.5% aqueous solution of 98% hydrolyzed, medium viscosity PVOH. The initial charge of water was decreased from 150 g to 75 g. The characteristics of the latex are shown in Table 1.

EXAMPLE 9

Using the general procedure described in Example 1, the test batch was prepared by replacing 100 g of the 10% aqueous solution of 88% hydrolyzed, medium viscosity PVOH by a 10% aqueous solution of 98% hydrolyzed, medium viscosity PVOH. In addition, 15% of the vinyl acetate was replaced by vinyl pivalate (VP). The characteristics of the latex are shown in Table 1.

EXAMPLE 10

Using the general procedure described in Example 1, the test batch was prepared by replacing 100 g of the aqueous solution of 88% hydrolyzed, medium viscosity PVOH by a 10% aqueous solution of 98% hydrolyzed, medium viscosity PVOH. In addition, 7.5% of the vinyl acetate was replaced by vinyl pivalate (VP). The characteristics of of the latex are shown in Table 1.

EXAMPLE 11

Using the general procedure described in Example 1, the test batch was prepared by replacing 100 g of the 10% aqueous solution of 88% hydrolyzed, medium viscosity PVOH by a 10% aqueous solution of 98% hydrolyzed, medium viscosity PVOH. In addition, 7.5% of the vinyl acetate was replaced by vinyl versatate (VV-10). The characteristics of the latex are shown in Table 1.

In some cases a series of emulsions were prepared to show the reproducibility of the emulsion properties. In Tables 1 and 2, these emulsions series are designated alphabetically.

TABLE 1

| EX. # | | 88% M PVOH | 95% M PVOH | 98% L PVOH | 98% M PVOH | TOTAL* PVOH | SOLIDS % | VISCOSITY Cps | pH | INSOLUBLE % | GRIT % | MECHN. STABILITY |
|---|---|---|---|---|---|---|---|---|---|---|---|---|
| 1 | | 4 | | Control | Sample | 4 | 48.8 | 6800 | 4.4 | 96 | 0.1 | G |
| 2 | A. | 2 | | | 2 | 4 | 46.2 | 3100 | 4.6 | 96 | 0.04 | G |
| | B. | 2 | | | 2 | 4 | 49.5 | 1700 | 5.0 | 97 | 0.11 | G |
| | C. | 2 | | | 2 | 4 | 46.7 | 1225 | 5.0 | 98 | 0.07 | G |
| | D. | 2 | | | 2 | 4 | 53.0 | 1650 | 4.8 | 93 | 0.07 | G |
| | E. | 2 | | | 2 | 4 | 48.0 | 1500 | 4.6 | 87 | 0.03 | G |
| 3 | | 2 | | | 3 | 5 | 51.0 | 2400 | 4.6 | 87 | 0.03 | G |
| 4 | | 1 | | | 3 | 4 | 47.5 | 1620 | 4.8 | 93 | 0.03 | P |

TABLE 1-continued

| EX. # | | 88% M PVOH | 95% M PVOH | 98% L PVOH | 98% M PVOH | TOTAL* PVOH | SOLIDS % | VISCOSITY Cps | pH | INSOLUBLE % | GRIT % | MECHN. STABILITY |
|---|---|---|---|---|---|---|---|---|---|---|---|---|
| 5 | | 3 | | | 2 | 5 | 48.6 | 3200 | 4.9 | 93 | 0.03 | G |
| 6 | A. | 3 | | | 3 | 6 | 48.8 | 5200 | 5.0 | 93 | 0.04 | G |
| | B. | 3 | | | 3 | 6 | 50.4 | 4250 | 5.0 | 91 | 0.02 | G |
| 7 | A. | 2 | | 1 | 2 | 5 | 46.8 | 3740 | 5.0 | 91 | 0.02 | G |
| | B. | 2 | | 1 | 2 | 5 | 48.7 | 3900 | 4.7 | 92 | 0.06 | G |
| | C. | 2 | | 1 | 2 | 5 | 49.8 | 2300 | 4.8 | 86 | 0.03 | G |
| 8 | | 2 | 3 | | | 5 | 48.1 | 2950 | 5.0 | 93 | 0.01 | G |
| 9 | | 2 | | | 2 | 4 | 50.1 | 2800 | 4.3 | 93 | .01 | G |
| 10 | | 2 | | | 2 | 4 | 49.0 | 1100 | 5.0 | 97 | .01 | G |
| 11 | | 2 | | | 2 | 4 | 47.0 | 800 | 5.0 | 90 | .02 | G |

Legend: Ex. = Examples; 88% m 95%, 98% = degree of hydrolysis; L = Low viscosity, M = medium viscosity; * = weight of PVOH as parts per hundred parts by weight of vinyl acetate monomer in the recipe.
Insolubles = A 3-mil wet film is air dried for 2 hours, followed by 130° C. for 30 minutes. One gram of this film is dissolved in 100 cc of acetone for 12 hours and filtered. The residue is dried and weighed. The difference is noted as % insolubles.
Mechanical Stability: G = Good; P = Poor.

TEST METHODS

Formulation

Woodworking adhesives were formulated from the adhesive emulsions of Examples 1-11 as follows:
A—Latex base (Control/Test batch)=94.0
B—Phenolic Resin=6.0
C—Aluminum chloride solution (20% w/w)=5.0

The latex base 'A' was first mixed with the fusion aid 'B' to form a smooth dispersion. This mixture was allowed to age overnight; then the cure accelerator 'C' was mixed in for 30 minutes.

TESTING

Using the above standard formulated adhesives, the performance of the adhesives was evaluated using the ASTM D-3110 Exterior Edge Glue test methods. In this test, wood pine edge glue constructions were made via a radio frequency press after applying the adhesive at 8 wet mils thickness. After a 7-day cure at room temperature, these constructions were exposed to three types of tests as follows:

1. Room Temperature Testing
   Blocks are broken via a compression shear at room temperature. The results of the test are shown in Table 2.
2. Pressure Soaks
   Blocks are placed in a pressure vessel and submerged at room temperature water. A vacuum of 25 inches of Hg is then drawn on the samples for 30 minutes followed by 75 psi of water pressure for 30 minutes. The samples are then removed and broken via the compression shear while the samples are still wet. The results of the test are shown in Table 2.
3. Boils
   Blocks are placed in boiling water for 4 hours followed by over drying at 145° F. for 20 hours. The samples are then placed back in boiling water for 4 hours, followed by soaking in room temperature water for 1 hour and finally broken via compression shear while still wet.
   The results of the test are shown in Table 2.

TABLE 2

| EX. # | | 88% M PVOH | 95% M PVOH | 98% L PVOH | 98% M PVOH | TOTAL PVOH | ROOM TEMPERATURE | | PRESSURE SOAKS | | BOILS | |
|---|---|---|---|---|---|---|---|---|---|---|---|---|
| | | | | | | | SHEAR STRENGTH PSI | WOOD TEAR % | SHEAR STRENGTH PSI | WOOD TEAR % | SHEAR STRENGTH PSI | WOOD TEAR % |
| 1 | | 4 | Control | Sample | | 4 | 1491 | 95 | 522 | 17 | 39 | 03* |
| 2 | A. | 2 | | | 2 | 4 | 1395 | 92 | 764 | 67 | 571 | 58 |
| | B. | 2 | | | 2 | 4 | 1257 | 98 | 649 | 79 | 478 | 78 |
| | C. | 2 | | | 2 | 4 | 1266 | 97 | 711 | 48 | 501 | 73 |
| | D. | 2 | | | 2 | 4 | 1152 | 94 | 598 | 71 | 384 | 43 |
| | E. | 2 | | | 2 | 4 | 770 | 90 | 573 | 77 | 354 | 83 |
| 3 | | 2 | | | 3 | 5 | 1128 | 100 | 480 | 64 | 444 | 58 |
| 4 | | 1 | | | 3 | 4 | 1123 | 99 | 699 | 21 | 545 | 63 |
| 5 | | 3 | | | 2 | 5 | 1071 | 96 | 665 | 27 | 352 | 19 |
| 6 | A. | 3 | | | 3 | 6 | 1316 | 97 | 666 | 48 | 394 | 25 |
| | B. | 3 | | | 3 | 6 | 1148 | 95 | 603 | 21 | 215 | 41 |
| 7 | A. | 2 | | 1 | 2 | 5 | 1137 | 97 | 749 | 74 | 605 | 80 |
| | B. | 2 | | 1 | 2 | 5 | 1120 | 94 | 557 | 46 | 473 | 33 |
| | C. | 2 | | 1 | 2 | 5 | 1169 | 96 | 584 | 54 | 408 | 69 |
| 8 | | 2 | 3 | | | 5 | 1272 | 95 | 615 | 54 | 291 | 51 |
| 9 | | 2 | | | 2 | 4 | 970 | 90 | 537 | 74 | 407 | 78 |
| 10 | | 2 | | | 2 | 4 | 1202 | 99 | 713 | 87 | 543 | 79 |
| 11 | | 2 | | | 2 | 4 | 1326 | 95 | 680 | 65 | 410 | 44 |

*Four out of 10 wood block specimens fell apart during the boiling cycles

Table 2 shows the performance of the adhesives under all 3 test exposure conditions. It should be noted that the "BOILS" test is more severe than the "PRESSURE SOAKS" test, which in turn is more severe than the "ROOM TEMPERATURE" test. In addition, it is important to note that the "percent wood tear" is an excellent indicator of the differences in the performance of the various adhesives. It should be noted that there is a degree of variability between samples tested using the procedures described above. This variability is due, in part, to the individual wood samples tested, with greater variation in results observed in tests, as here, where pine was used as the wood substrate.

As the results presented in Table 2 show, there are no significant differences in the room temperature test results between the Control batch (Ex#1) and the batches prepared in accordance with the present invention. However, the test results indicate that the adhesives are all high performance adhesives.

Significant differences were observed between the control and the test samples in the pressure soaks test. In that test, the control sample (Ex#1) exhibited a shear strength of 522 psi and a wood tear of only 17%, whereas, when 2 pphm of the 88% PVOH was replaced by 98% M PVOH (Ex#2), the shear strength increased to 695 psi (a 26% increase) and the wood tear increased by a magnitude of 3 to 68.4% (average).

Increasing the level of 98% M PVOH from 2 pphm to 3 pphm (Ex#3) also exhibited 64% wood tear. Addition of an extra 1 pphm of 98% L PVOH (Ex#7) to the recipe of Ex#2 also resulted in excellent performance of 630 psi shear and 58% wood tear. Replacing the 98% M PVOH by 95% M PVOH (in Ex#8) also resulted in excellent performance. Hence, Ex #2, 3, 7 and 8 exhibit excellent water resistance compared to the control.

Increasing the level of 88% PVOH leads to a decrease in water resistance. Thus, in the case of Ex#5, increasing the 88% PVOH to 3 pphm resulted in a decrease in wood tear from 68% (Ex#2) to 27%. However, no significant decrease in the shear strength values are observed. In Ex#6, addition of an extra 1 pphm of 98% M PVOH to Ex#5 only marginally improved the water resistance, indicating the higher levels of 88% PVOH is detrimental towards water resistance. Further, the use of only 1 pphm of 88% PVOH gave not only poor mechanical stability but also low pressure soak values.

The above results show that the incorporation of PVOH whose degree of hydrolysis is higher than 88% leads to a significant improvement in water resistance. Conversely, the presence of 88% PVOH leads to a decrease in water resistance.

As discussed above, the boils test is the most severe test. The test results presented in Table 2 clearly show that the incorporation of polyvinyl alcohol whose degree of hydrolysis is greater than 88%, results in a very significant increase in not only the water resistance but also the heat resistance. This is reflected in the shear strength and wood tear values of the test samples when compared to the control sample (Ex#1).

The control sample (Ex#1) exhibited a shear strength of only 39 psi and a wood tear of only 3%. In addition, 4 out of 10 wood block specimens used for the test fell apart during the boiling cycles indicating very poor heat and water resistance.

In contrast, incorporation of polyvinyl alcohol whose degree of hydrolysis is greater than 88%, exhibited shear strength values ranging from 350-600 psi and a wood tear of over 50%. These values indicate excellent heat and water resistance, thus proving to be superior wood working adhesives.

Furthermore, as in the previous test (pressure soaks), Ex#5 exhibited a decrease in performance (compared to Ex#2) which is attributed to the increase in the level of 88% PVOH in the latex. Again, an improvement is observed when the level of 98% M PVOH is also increased.

Hence, the common factor that contributes to significant improvements in both the water resistance as well as the heat resistance, is the incorporation of polyvinyl alcohol specific proportions of whose degree of hydrolysis 95–99.5%.

Examples 9, 10, 11 show that vinyl acetate may be substituted with other vinyl esters such as vinyl pivalate (VP) or vinyl versatate (VV-10) in the mixed degree of hydrolysis system without detracting from their improved properties as a wood adhesive.

We claim:

1. A woodworking adhesive comprising a polyvinyl alcohol stabilized vinyl acetate/N-methylol acrylamide containing emulsion, said polymer consisting essentially of:
   a) vinyl acetate;
   b) 0 to 40% by weight of the polymer of a copolymerizable monomer selected from the group consisting of vinyl esters other than vinyl acetate, alkyl esters of acrylic and methacrylic acid, mono- and dialkyl esters of alpha, beta unsaturated dicarboxylic acids and alpha, beta-unsaturated carboxylic acids;
   c) 0.1 to 6% by weight of the polymer of N-methylol acrylamide;
   d) 0 to 4% by weight of the polymer of an olefinically unsaturated acid; and
   said polymer being prepared in the presence of at least 3% by weight of a protective colloid system which consists of 1.5 to 2.5% by weight of 88% hydrolyzed polyvinyl alcohol and 1 to 4% by weight of 95-99.5% hydrolyzed polyvinyl alcohol;
   the resultant polymer being further formulated with at least one member selected from the group consisting of resorcinol formaldehyde, urea formaldehyde, phenol formaldehyde, trimethylol phenol oligomer, tetrahydrofurfuryl alcohol, ethylene glycol diacetate and ethylene glycol monoethyl ether acetate.

2. The woodworking adhesive of claim 1 wherein there is also present an acid metal salt curing agent in an amount of from 0.003 to 0.12 gram equivalents per 100 grams of the adhesive.

3. The woodworking adhesive of claim 1 wherein a member selected from the group consisting of resorcinol formaldehyde, urea formaldehyde, and phenol formaldehyde is present in an amount of 1 to 20% by weight of the polymer solids.

4. The woodworking adhesive of claim 1 wherein a trimethylol phenol oligomer is present in an amount of 1 to 20% by weight of the polymer solids.

5. The woodworking adhesive of claim 1 wherein a member selected from the group consisting of tetrahydrofurfuryl alcohol, ethylene glycol diacetate and ethylene glycol monoethyl ether acetate is present in an amount of 1 to 7% by weight of the polymer solids.

6. The woodworking adhesive of claim 5 additionally containing an acidic, metal salt curing agent and a cross linking inhibitor selected from the group consisting of ammonia, triethyl amine, triethanol amine and N-methylethanol amine in an amount such that the mole ratio of the crosslinking inhibitor to the curing agent ranges from 0.1 to 1.7.

7. The woodworking adhesive of claim 1 wherein there is additionally present in the vinyl acetate polymer up to 4 percent by weight of an alkenoic or alkenedioic acid having from 3 to 6 carbon atoms.

* * * * *